(12) United States Patent
Cortner, Jr.

(10) Patent No.: US 6,557,493 B2
(45) Date of Patent: May 6, 2003

(54) DELIVERY SYSTEM FOR APPLYING A TREATMENT MATERIAL TO ANIMALS

(76) Inventor: William C. Cortner, Jr., 1001 S. 9th St., P.O. Box 452, St. Joseph, Buchanan County, MO (US) 64503

( * ) Notice: Subject to any disclaimer, the term of this patent is extended or adjusted under 35 U.S.C. 154(b) by 0 days.

(21) Appl. No.: 09/825,368

(22) Filed: Apr. 3, 2001

(65) Prior Publication Data

US 2002/0139316 A1 Oct. 3, 2002

(51) Int. Cl.$^7$ ............................................. A01K 29/00
(52) U.S. Cl. ........................................ 119/652; 119/651
(58) Field of Search ................................. 119/652, 661, 119/663, 706, 651, 602, 603, 621, 622, 623, 650, 662

(56) References Cited

U.S. PATENT DOCUMENTS

| | | |
|---|---|---|
| 2,653,575 A | 9/1953 | Worden |
| 2,667,859 A | 2/1954 | Murray et al. |
| 2,688,950 A | 9/1954 | McKinley |
| 2,777,421 A | 1/1957 | Hiebert |
| 2,785,653 A | 3/1957 | Caldwell |
| 2,904,007 A | 9/1959 | Elfgren |
| 2,964,011 A * | 12/1960 | Hall ........................... 119/652 |
| 2,987,430 A * | 6/1961 | Cline ........................... 156/70 |
| 2,991,756 A * | 7/1961 | Thaete ........................ 119/661 |
| 3,045,647 A | 7/1962 | Bristle |
| 3,051,128 A | 8/1962 | McKinley |
| 3,079,893 A | 3/1963 | Francisco, Sr. |
| 3,116,717 A | 1/1964 | Ragsdale |
| 3,159,144 A | 12/1964 | Duncan et al. |
| 3,202,132 A | 8/1965 | Lentz et al. |
| 3,677,233 A * | 7/1972 | White, Jr. .................... 119/661 |
| D231,840 S * | 6/1974 | Gould ........................ D30/158 |
| 4,870,926 A * | 10/1989 | Smith ........................ 119/658 |
| 4,905,629 A * | 3/1990 | Hand et al. .................. 119/61 |
| 5,911,196 A * | 6/1999 | Simmons et al. ............ 119/651 |

* cited by examiner

Primary Examiner—Michael J. Carone
Assistant Examiner—Son T. Nguyen
(74) Attorney, Agent, or Firm—Stinson Morrison Hecker LLP; J. David Wharton

(57) ABSTRACT

An applicator for applying a treatment material to an animal comprising an elongated, flexible, resilient, hollow brace member and an elongated, hollow swing element. These components are made of conventional CPVC pipe having an outside diameter of about ⅝ inch. The brace member is about 5 feet long and the swing element is about 2.5 feet long. An end of the swing element is swingably connected to and end of the brace member using a piece of rope. The opposite ends of a plurality of brace members are implanted in the ground in a predetermined plot at an angle of about 60° such that the swing elements dangle from the upper ends of the brace members. An insecticide gel is applied to the outer surfaces of the swing elements and brace members and a feed for the animal is spread on the ground in the plot. When the animal feeds, the brace members bend and the swing elements swing around so as to spread the insecticide gel all over the skin of the animal including its underside and lower leg areas.

28 Claims, 3 Drawing Sheets

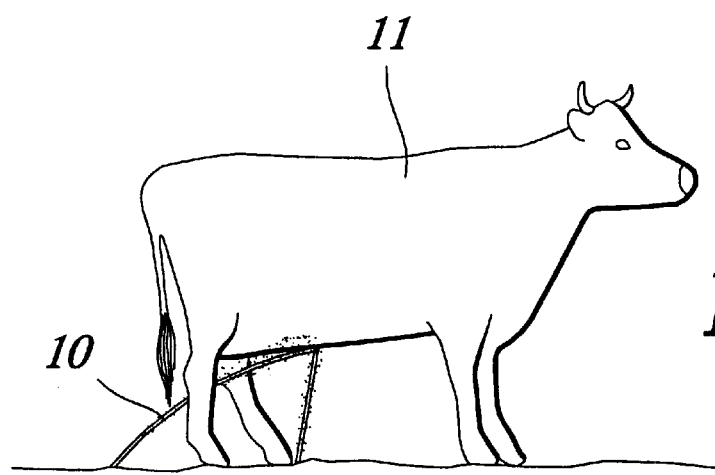
FIG. 1.
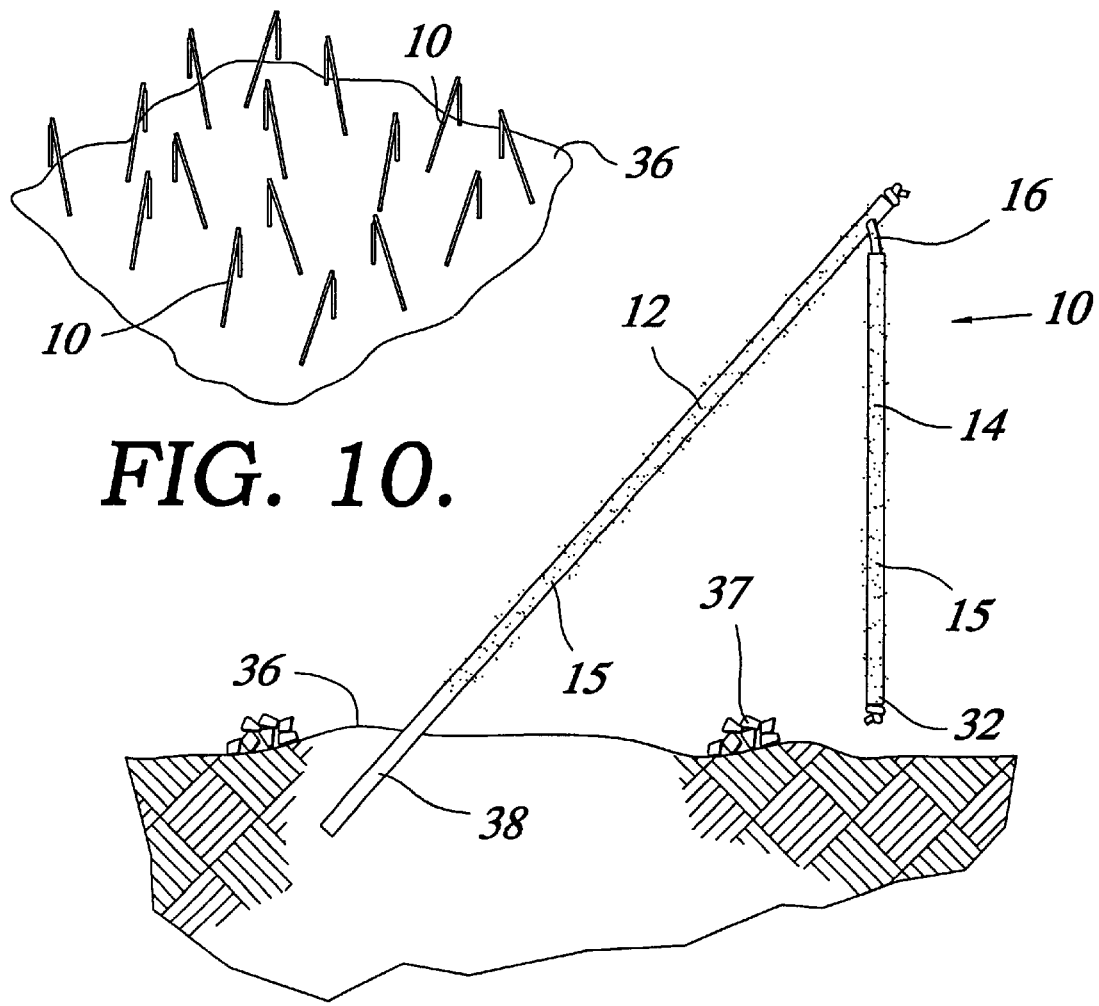
FIG. 10.
FIG. 2.

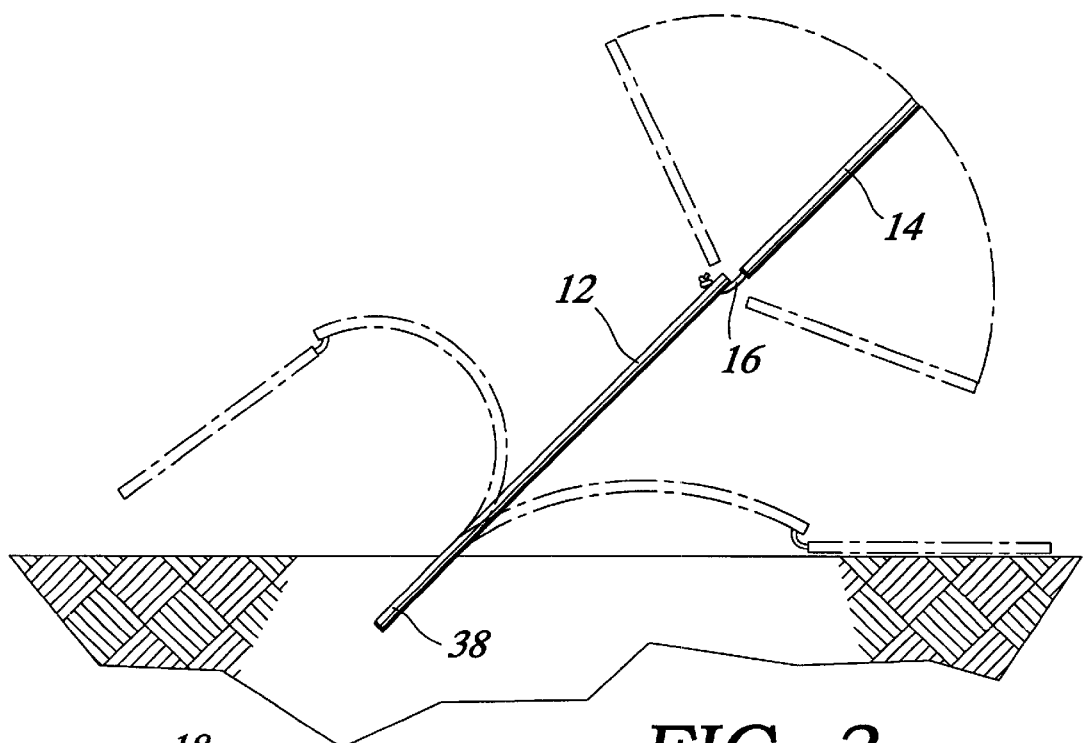
FIG. 3.
FIG. 4.
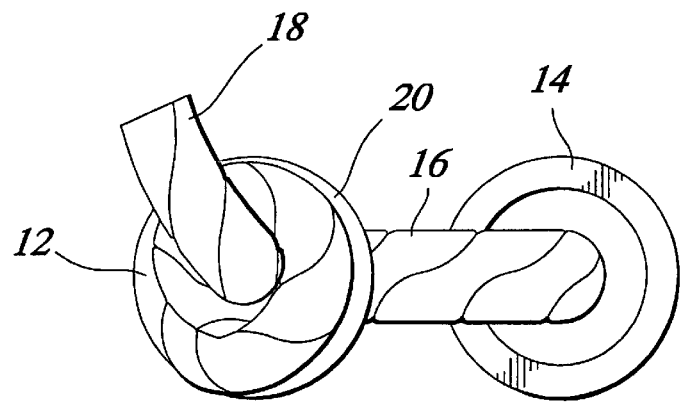
FIG. 5.

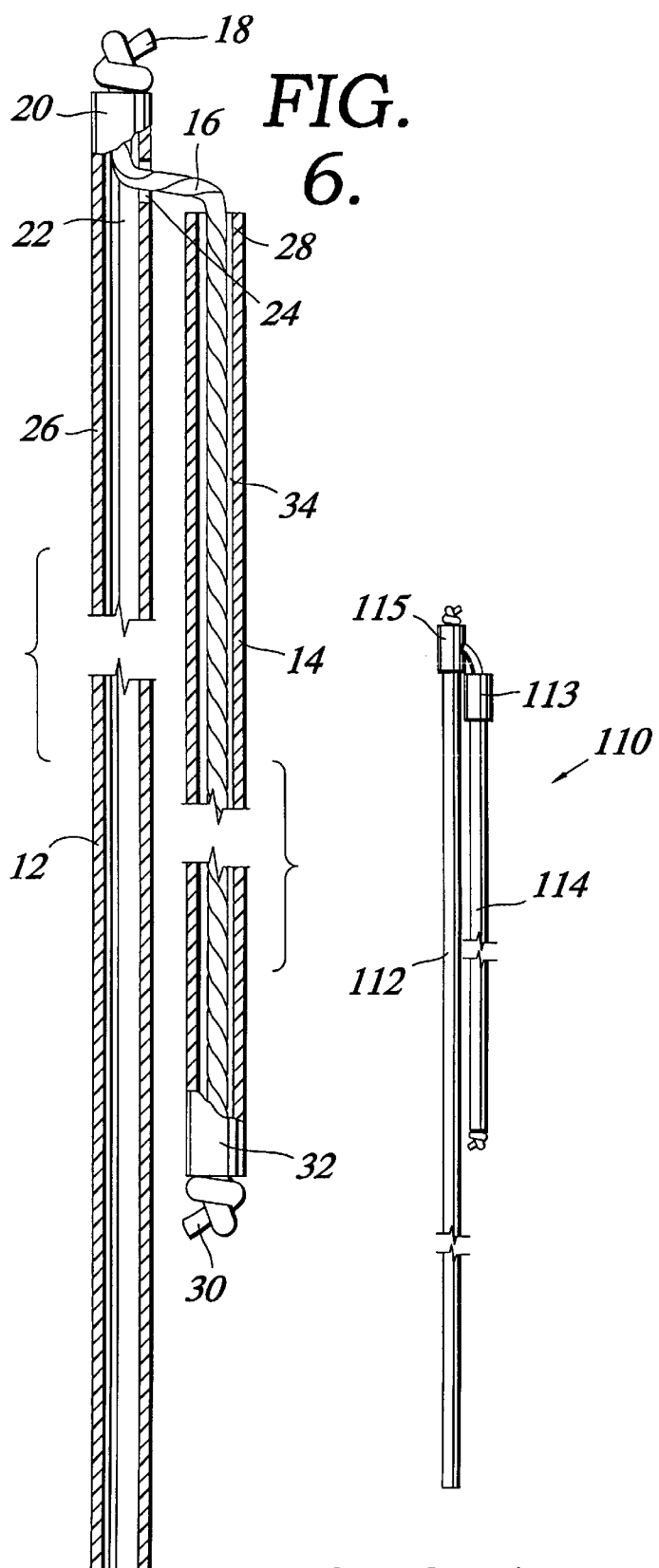
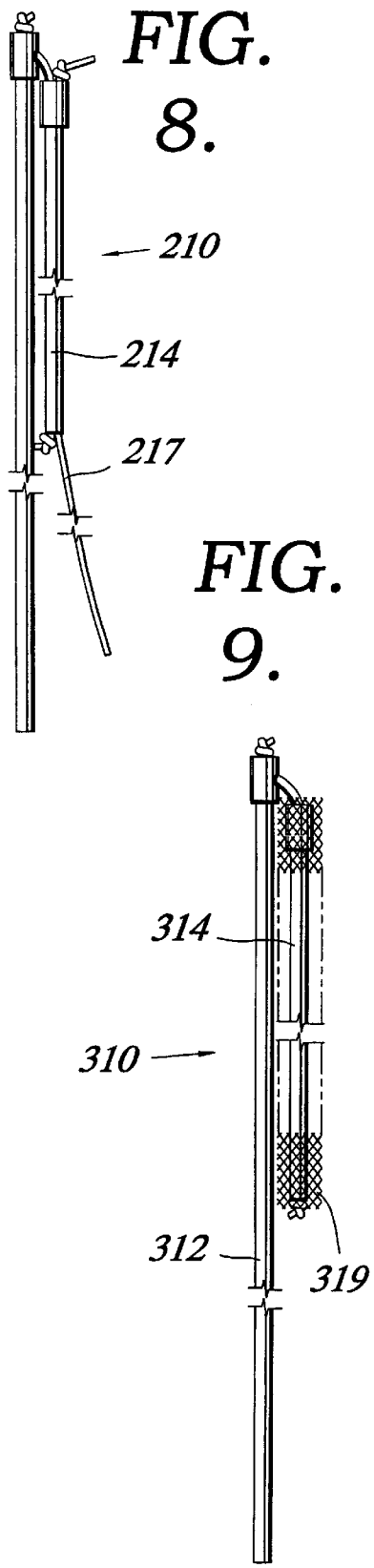
FIG. 6.
FIG. 7.
FIG. 8.
FIG. 9.

DELIVERY SYSTEM FOR APPLYING A TREATMENT MATERIAL TO ANIMALS

BACKGROUND OF THE INVENTION

1. Field of the Invention

The invention relates to a delivery system for applying a treatment material to animals. In particular, the invention relates to a delivery system for applying an insecticide gel or other sticky or viscous fluid to the entire outer skin surface, including the underside (belly), of a domesticated animal such as a cow or a wild animal such as a deer.

2. The State of the Prior Art

Flies, lice and ticks on cattle are a centuries old problem. Conventional ways of treating these pests include spraying, the use of dust bags which the animals rub up against, and other self-applicators which attract the animal once it learns that it applies relief. These techniques are effective to varying degrees, but none are particularly effective at removing flies and ticks from the stomach of the animal, which is nearly impossible to access with any of the conventional techniques.

Also, the increasing deer population in the United States is responsible for a significant increase in the tick population. In many areas of the country, it is impossible to control ticks on cattle unless the deer tick population can be controlled. It is virtually impossible to use any type of conventional insecticide applicator with wild deer.

SUMMARY OF THE INVENTION

The invention provides a delivery system in the preferred form of an applicator for applying a treatment material to an animal. The treatment material may be any thing which the user of the invention wishes to apply to the skin of a domestic or wild animal. Preferably, the treatment material may comprise an active ingredient such as an insect repellant or an insecticide. Ideally the active ingredient may be an insecticide for flies and/or ticks or the like. In addition, the treatment material may comprise a carrier component which is a gel-like substance or a viscous and/or sticky fluid which will stay put in the first instance on the applicator and after it is transferred to the skin of an animal by virtue of contact between the animal and the applicator, will stay put on the animal's hair and skin to thereafter repel and/or kill the insects. These insecticides and repellants and carriers are well known in the insect and pest control field and are not a part of the present invention.

In its broadest form, the applicator itself may comprise an elongated, flexible, resilient brace member having a first end and a second end. The first and second ends are spaced apart longitudinally of the brace member a first distance. The applicator may also include an elongated, flexible, resilient swing element having a proximal end and a distal end. The proximal end and the distal end are spaced apart longitudinally of the swing member a second distance. The swing element is swingably connected to the brace member with the proximal end of the swing element adjacent the second end of the brace member. The first distance is greater than the second distance so that when the first end of the brace member is implanted in the ground at an angle, the swing element dangles freely from said second end of the brace with its distal end spaced from the ground. Preferably the brace member and the swing element each have an outer surface adapted for carring a supply of treatment material which, in the most preferred form of the invention consists of a gel containing an insecticide.

In a preferred form of the invention, the member and the element may each be in the form of a flexible, resilient stick, preferably a length of chlorinated polyvinylchloride, (CPVC) plastic pipe. Other flexible materials such as fiberglass, soft wood or other plastics may be employed. Ideally, the CPVC plastic pipe may have an outside diameter of about ⅝ inch. In accordance with the invention, the brace member is implanted in the ground at an angle relative to vertical, whereby the distal end of the swing element is approximately 4 to 5 inches from the ground and approximately 12 to 16 inches away from the brace member in a horizontal direction. Ideally, the angle may be approximately 60°.

In accordance with the concepts and principles of the invention, the brace member may be approximately 5 feet in length and the swing element may be approximately 2.5 feet in length. The applicator may also include a piece of rope for swingably connecting the swing element to the brace member. In a most preferred form of the invention, an end reinforcement may be provided for the proximal end of the swing element.

In an alternative form of the invention, a mesh net disposed in surrounding relationship to at least a portion of the swing element may be included. In another alternative form of the invention, the applicator may include a reservoir for the treatment material. Ideally, the reservoir may be in the form of a piece of flexible tubing formed from rubber or Tygon or the like having an end that is secured inside the swing element and a delivery portion that protrudes from the distal end.

invention also provides a method for applying a treatment material to an animal. The method preferably employs a plurality of the applicators of the invention. In accordance with the invention, a plot of ground is selected and the applicators are implanted in the plot with the first ends of the brace members in the ground so that the brace members extend upwardly at a non-vertical angle relative to the ground. Ideally, and in accordance with the principles and concepts of the invention, a feed material for the animal can be distributed on the ground within the plot to attract the animals to be treated and an insecticide gel is applied to the outer surfaces of the brace member and the swing element.

BRIEF DESCRIPTION OF THE DRAWINGS

FIG. 1 is a schematic view illustrating the applicator of the invention in treatment contact with the stomach of a cow;

FIG. 2 is an elevational view of an embodiment of the applicator of FIG. 1 in its normal at rest position;

FIG. 3 is a schematic elevational view illustrating the action of the applicator of FIG. 1 when it is contacted by an animal during operation;

FIG. 4 is an elevational view of the applicator of FIG. 1 in a pre-installation configuration;

FIG. 5 is an enlarged top view looking downwardly at the applicator as it is shown in FIG. 4 illustrating the connection between the brace stick and the swing;

FIG. 6 is an enlarged elevational views, partly in cross-section, illustrating the details of the applicator of FIG. 4;

FIG. 7, 8 and 9 are views similar to FIG. 4 but illustrating alternative embodiments of the invention; and FIG. 10 is a schematic isometric view illustrating one possible arrangement of a plurality of the applicators of the invention in a plot of ground.

DETAILED DESCRIPTION OF PREFERRED EMBODIMENTS OF THE INVENTION

A delivery system or applicator 10 which embodies the principles and concepts of the invention is illustrated in FIG.

2. The delivery system may broadly be employed for applying a treatment material, such as an insecticide, to the hair and skin of an animal such as a cow 11. This operation is illustrated schematically in FIG. 1.

In accordance with the principles and concepts of the invention, and as described above, the treatment material may be any thing which the user of the invention wishes to apply to the skin of a domestic such as a cow or wild animal such as a deer. Preferably, the treatment material may comprise an active ingredient such as an insect repellant or an insecticide. Ideally the active ingredient may be an insecticide for flies, lice and/or ticks or the like. In addition, the treatment material may comprise a carrier component which is a gel-like substance or a viscous and/or sticky fluid which will stay put in the first instance on the applicator, and after it is transferred to the hair and skin of an animal by virtue of contact between the animal and the applicator, will stay put on the animal's hair and skin to thereafter repel and/or kill the insects. Such insecticides, repellants and carriers are well known in the insect and pest control field and are not necessarily a part of the present invention.

The applicator 10 preferably includes a brace member 12 and a swing element 14. The brace member 12 and the swing element 14 may each be in the form of an elongated, flexible, stick, although the swing element may also be rigid and nonresilient. Preferably, however, the member 12 and the element 14 may each be constructed from a respective length of conventional chlorinated polyvinylchloride (CPVC) pipe having an outside diameter of about ⅝ inch and a wall thickness of about 2 mm. The brace member 12 may desirably be about 5 feet in length and the swing element 14 may desirably be about 2.5 feet in length. Ideally, both the brace member 12 and the swing element 14 may have their respective outer surfaces covered with the treatment material, which is shown schematically in FIG. 2, where it is identified by the reference numeral 15.

With reference to FIGS. 5 and 6, it can be seen that the swing element 14 may preferably be swingably connected to brace member 12 using a piece of rope 16. Thus, rope 16 is preferably knotted at its upper end 18 so that it is prevented from sliding into the interior hollow space 22 at the upper end 20 of brace member 12. Rope 16 is then strung down through space 22, through an opening 24 in the sidewall 26 of member 12, through the upper open end 28 of element 14 and down through the interior hollow space 34 of swing element 14 for the entire length of the latter. Rope 16 is also preferably knotted at its lower end 30 as shown so that it is prevented from sliding into the interior hollow space 34 at the lower distal end 32 of swing element 14.

In use, a multiplicity of the applicators 10 are employed in a given plot of ground 36 which is illustrated schematically in FIG. 10. As illustrated in FIG. 10, 16 applicators 10 are used in the plot 36. However, the actual number used may vary depending upon the relative size of the plot 36 and the number of individual animals to be treated. The applicators 10 are installed in the plot 36 by implanting the lower ends 38 of the brace members 12 of the applicators 10 in appropriate pilot holes that are preferably 12 to 16 inches deep. The pilot holes and therefore the brace members 12 should preferably be disposed at an angle relative to the vertical (See FIG. 2) so that the swing elements 14 depend vertically, perpendicular to the ground, with the lower ends 32 thereof positioned about 4 to 5 inches above the ground and about 12 to 16 inches away from the respective brace members 12 in a horizontal direction.

Preferably, the individual applicators 10 should be arranged with a lateral spacing throughout the plot 36 such that the target animals are forced to come into contact with both the brace members 12 and the swing elements 14 as the plot 36 is traversed. Thus, it is preferred that the distance between each applicator 10 and each adjacent applicator should be about 5 to 6 feet for most cattle and shorter distances (3–4 feet) for deer. Traversal of the plot 36 by the target animals may be encouraged by spreading an appropriate animal feed in the form of pellets, salt and/or range cubes 37 around the plot 36. The contact between the animals and the applicators 10 automatically transfers the treatment material from the applicators 10 to the hair and skin of the animals as they feed.

Even with a single applicator 10, when the distal end 32 of the swing element 14 is positioned as discussed above and the animal feed 37 is placed about half way between the distal end 32 of the swing element and the place where the brace member 12 enters the ground, the target animals will be forced to make the desired contact with the brace member 12 and the swing element 14 of the applicator 10.

When the animals feed, their heads, necks and shoulders will press against the brace members 12 and the swing elements 14 will drape over their bodies. Further, when there is appropriate spacing between adjacent applicators, the animals' tails, rear legs, front legs and side bodies randomly come into contact with the applicators 10 insuring that the treatment gel 15 is applied to both sides of each animal as the animals graze through the baited area. Additionally, the and bottom sides of the animals will be treated since in practice the animals pay little or no attention to the applicators and will actually straddle and walk over the brace members 12, thus causing a transfer of the treatment gel 15 to the lower legs and bottom sides of the animals being treated. As this action takes place, the brace members 12 are sometimes bent over toward the ground by the weight of the animal. Thus, when the animal moves on and steps away from the applicator 10, the brace element 12 springs back to its neutral, unbent condition and the respective swing element 14 is flung into the air hitting the animals on the upper and top sides as it swings through its propelled arc. This action is schematically illustrated in FIG. 3. It is noteworthy in connection with the foregoing that the leverage and fulcrum function is created by the angled placement of the applicator 10, coupled with the resilience and elasticity of the member 12, which together cause the swing element 14 to greatly enhance the geometric action of the applicator 10 when animals come into contact with the brace member.

The number and grouping (pattern) of the applicators 10 may be varied from application to application according to the number and type of animals to be treated. The applications may also be placed in a random pattern in front of gateways or along established paths of travel leading to food, water or shelter where they will intersect the animals where they are following established behavior patterns. The invention thus facilitates the self-placement of a measured dose of treatment material to domestic or wild animals that are unrestrained in pastures or natural habitat.

The applicator 10 thus provides a delivery system which has particular utility for applying an insecticide gel to animals for the control of ecto or internal parasites. The prepared gel may be packed in a tube and applied to the components 12, 14 of the applicator 10 using a caulking gun. In this regard, the gel may preferably by somewhat thixotropic so that it will stick to the outer surfaces of the applicator components as well as to the hair and skin of the treated animal.

Alternative embodiments of the applicator are illustrated in FIGS. 7 through 9. The applicator 110 of FIG. 7 is essentially the same as the applicator 10 except that in this embodiment respective reinforcing caps 113, 115 are provided at the upper ends of brace member 112 and swing element 114. These reinforcement caps 113, 115 may preferably be formed from CPVC pipe (other materials can be utilized) having an inside diameter which coincides with the outside diameter of the element 112 or member 114 to be reinforced.

The applicator 210 of FIG. 8 is essentially the same as applicator 110 of FIG. 7, except that in this case the hollow, flexible, resilient swing element 214 may be somewhat shorter than the swing element 114 of the applicator 110. In addition, the applicator 210 may desirably include a length of flexible rubber or Tygon tubing 217 which extends from inside the interior hollow space of element 214 and protrudes downwardly therefrom as shown. Flexible tubing 217, which may be provided with a series of holes (not illustrated) spaced along its length, provides a reservoir for larger amounts of the treatment material.

The applicator 310 of FIG. 9 is again essentially the same as the applicator. 110 of FIG. 7, except that in this case a mesh or net sleeve 319 may be placed around the swinging element 314 in surrounding relationship thereto. A similar sleeve (not shown) may be placed around the brace member 312. These sleeves 319 operate to increase the quantity of gel that may be carried by the applicator 310 to thereby prolong the effectiveness period by restricting the release of the gel as animals come into contact with the brace member 312 and/or the swing element 314 of the applicator 310.

The present invention is a tremendous improvement over prior art devices because it results in the application of insecticide to the stomach of the animal and further, because it can be placed in the wild, and feed pellets, corn or salt can be used to attract wild deer, which will then receive a dose of insecticide. The device is able to reach the underside (belly) of the animal because of the flexibility and resilience of the plastic pipe, which the animals will step over and around and bend over, resulting in it rubbing against their undersides, as well as all other parts of the animal's body.

In sum, the present invention provides an improved insecticide applicator which comprises a first flexible, resilient rod that is inserted into the ground and a second freely movable section which hangs in pendulum fashion from the first section. Insecticide may preferably be applied to both sections of the rod by a caulking-type gun. Feed pellets (corn or other attractants) may be placed on the ground in the vicinity of the rods which are desirably angled at approximately 60°. Cattle, deer or other target animals move into the area where the insecticide applicators are located and manage to step over, around and through the applicators placing insecticide all over their bodies during the process. A particular advantage is the ability to get insecticide on the underside and lower leg areas of the animal which is not the case with any other known types of self use applicators. While the invention has been described with reference to cattle and deer, it is to be understood that it is applicable to any fur bearing animal, wild or domestic, for which there is a need to control insects or other parasites.

I claim:

1. An applicator for applying a treatment material to an animal, said applicator comprising:

an elongated, flexible, resilient brace member having a first end and a second end, said first and second ends being spaced apart longitudinally of the brace member a first distance; and an elongated, swing element having a proximal end and a distal end, said proximal end and said distal end being spaced apart longitudinally of the swing member a second distance, said swing element being swingably coupled with said brace member with the proximal end of the swing element adjacent the second end of the brace member, said first distance being greater than said second distance, said first end of the brace member being adapted for implanting in the ground at an angle whereby said element dangles freely from said second end of the brace with said distal end spaced from the ground.

2. An applicator as set forth in claim 1, wherein said member and said element each have an outer surface adapted for carrying a supply of treatment material.

3. An applicator as set forth in claim 2, wherein said treatment material comprises a gel.

4. An applicator as set forth in claim 2, wherein said treatment material comprises a gel containing an insecticide.

5. A method for applying a treatment material to an animal comprising:

providing a plurality of applicators as defined in claim 2;

selecting a plot of ground; and implanting the first ends of the brace members of said applicators in the ground in said plot so that the members extend upwardly at a non-vertical angle relative to the ground.

6. A method as set forth in claim 5, wherein a feed material for said animal is distributed on the ground within said plot.

7. A method as set forth in claim 6, wherein an insecticide gel is applied to the outer surfaces of said member and said element.

8. A method as set forth in claim 7, wherein said distances are such that the distal end of the swing element is approximately 4 to 5 inches from the ground.

9. A method as set forth in claim 7, wherein said distances are such that the distal end of the swing element is approximately 12 to 16 inches away from the brace member.

10. A method as set forth in claim 7, wherein said distances and said angle are such that the distal end of the swing element is approximately 4 to 5 inches from the ground and approximately 12 to 16 inches away from the brace member in a horizontal direction.

11. A method as set forth in claim 7, wherein said angle is approximately 60°.

12. A method as set forth in claim 5, wherein said animal is a domesticated animal.

13. A method as set forth in claim 5, wherein said animal is a cow.

14. A method as set forth in claim 5, wherein said animal is a deer.

15. An applicator as set forth in claim 1, wherein said member and said element are each in the form of a flexible, resilient stick.

16. An applicator as set forth in claim 15, wherein said flexible, resilient sticks are each in the form of a plastic pipe.

17. An applicator as set forth in claim 16, wherein said plastic is CPVC.

18. An applicator as set forth in claim 17, wherein said CPVC pipe has an outside diameter of approximately ⅝ inch.

19. An applicator as set forth in claim 15, wherein said member is approximately 5 feet in length and said element is approximately 2.5 feet in length.

20. An applicator as set forth in claim 1, wherein said treatment material comprises a gel.

21. An applicator as set forth in claim 1, wherein said treatment material comprises a gel containing an insecticide.

22. An applicator as set forth in claim 1, wherein said distances are such that the distal end of the swing element is approximately 4 to 5 inches from the ground when the first end of the brace member is implanted in the ground.

23. An applicator as set forth in claim 22, wherein said distances are such that the distal end of the swing element is approximately 12 to 16 inches away from the brace member in a horizontal direction when the first end of the brace member is implanted in the ground.

24. An applicator as set forth in claim 1, wherein said distances are such that the distal end of the swing element is approximately 12 to 16 inches away from the brace member in a horizontal direction when the first end of the brace member is implanted in the ground.

25. An applicator as set forth in claim 1, comprising a piece of rope for swingably connecting said member and said element.

26. An applicator as set forth in claim 1, wherein is included an end reinforcement mounted on the proximal end of the swing element.

27. An applicator as set forth in claim 1, wherein is included a mesh net disposed in surrounding relationship to said swing element.

28. An applicator as set forth in claim 1, wherein is included a reservoir for said treatment material comprising a length of flexible tubing having an end that is disposed inside said swing element and a delivery portion that protrudes from said distal end.

* * * * *